No. 736,564. Patented August 18, 1903.

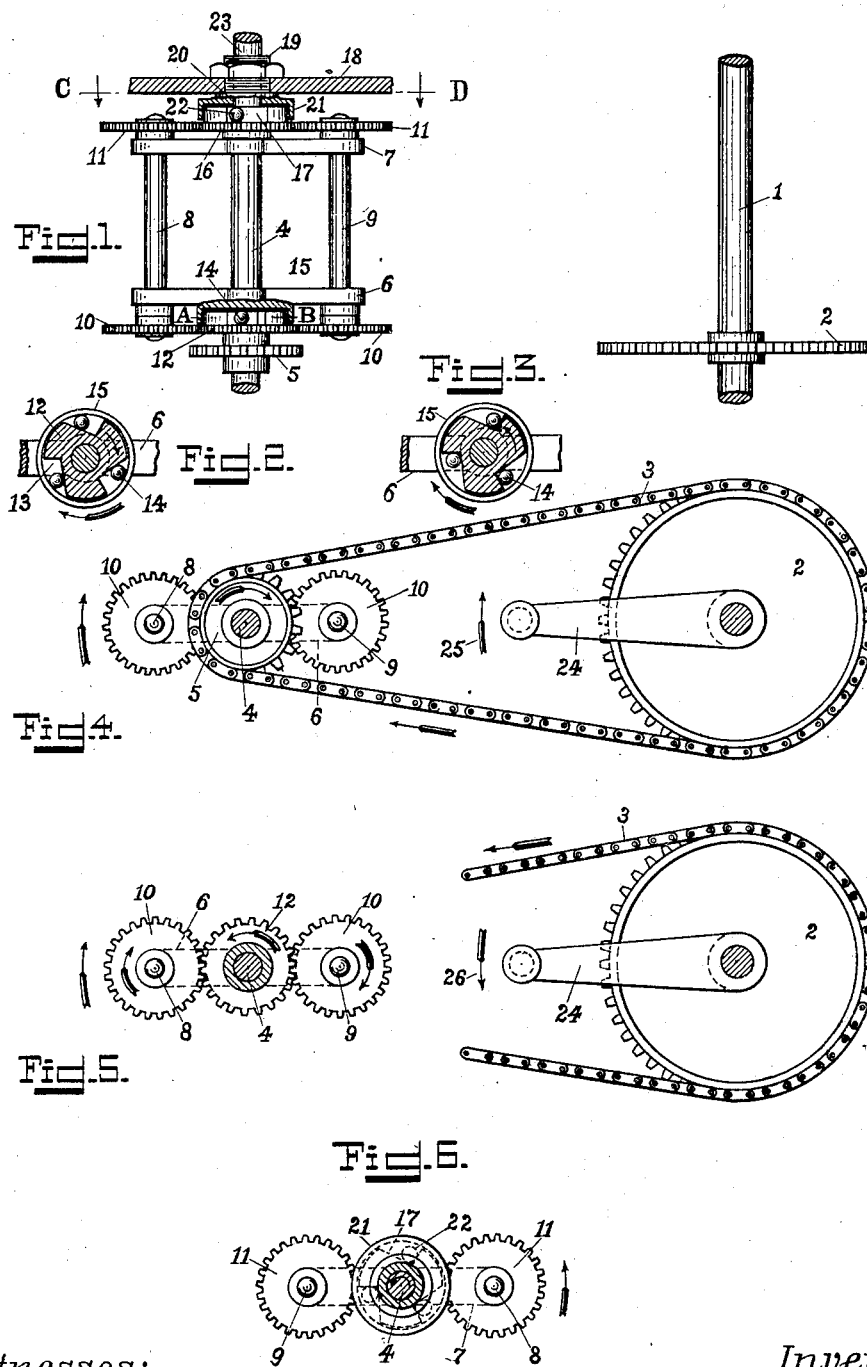

UNITED STATES PATENT OFFICE.

CHRISTIAN STOLLEWERK, OF AIX-LA-CHAPELLE, GERMANY.

DRIVING MECHANISM.

SPECIFICATION forming part of Letters Patent No. 736,564, dated August 18, 1903.

Application filed July 16, 1901. Serial No. 68,528. (No model.)

*To all whom it may concern:*

Be it known that I, CHRISTIAN STOLLEWERK, music-teacher, a subject of the King of Prussia, German Emperor, residing at 49 Alfonsstrasse, Aix-la-Chapelle, in the Kingdom of Prussia, Empire of Germany, have invented certain new and useful Improvements in Driving Mechanism; and I do hereby declare the following to be a full, clear, and exact description of the invention, such as will enable others skilled in the art to which it appertains to make and use the same.

My present invention relates to driving mechanism, and particularly to such in which the rotation of the driving-shaft in opposite directions imparts to the driven shaft two different speeds, but the direction of rotation of the driven shaft remains the same while running at these different speeds.

The object in view is to provide a driving mechanism which may be used with advantage alike on bicycles, automobiles, sewing-machines, and similar other machines where for different reasons it is desirable to exchange a loss of speed for a gain in power without changing the direction of rotation of the driven shaft.

In the accompanying drawings, Figure 1 is a plan view of the driving mechanism. Figs. 2 and 3 are cross-sections of the hub of one clutch-wheel and the locking-balls when said wheel is running in opposite directions, taken on line A B, Fig. 1. Fig. 4 is a side view of the driving mechanism. Fig. 5 is a similar view of the same mechanism having one of the sprocket-wheels and a part of the chain removed. Fig. 6 is a rear view of the driving mechanism on line C D, Fig. 1, when running at the fastest speed.

Upon the drifting-shaft 1 is seated the big sprocket-wheel 2. The chain 3 unites the driving-shaft 1 with the driven shaft 4 indirectly by running over the smaller sprocket-wheel 5. Upon the driven shaft 4 are seated the traverses 6 and 7, bearing in their ends the smaller shafts 8 and 9, carrying upon their ends the wheels 10 and 11, respectively. The wheels 10 mesh with a wheel 12, carrying at one end of its hub the sprocket-wheel 5 and showing at the other end of its hub a number of triangular notches 13, capable of holding balls 14 at their deepest part, so that the balls cannot touch the circular ball-race 15, forming an integral part of the adjacent traverse 6. (See Fig. 3.) In a similar manner the wheels 11 mesh with the wheel 16, loosely seated upon the driven shaft 4, and its hub is provided with a number of notches 17, similar to those of the hub of the wheel 12, the only difference being that they are arranged in the opposite direction, for reasons more particularly explained below. In any adjacent stationary part 18 of a bicycle or any other machine is secured an adjustable hollow stud 19, provided at its free end with a head 20, forming the ball-race 21 for the balls 22, working in the notches 17 of the hub of the wheel 16. The reduced end 23 of the driven shaft 4 is journaled in the hollow stud 19, thus giving to the mechanism a greater rigidity and keeping all the working parts in an axial line with each other.

The mode of operation of the driving mechanism is as follows: Supposing the mechanism applied to an ordinary bicycle, then the crank 24 of Fig. 4 would turn in the direction as indicated by the arrow 25 and the chain 3 would revolve the sprocket-wheel 5 in the same direction as the crank 24 turns. As the wheel 12 is rigidly secured to the hub of the sprocket-wheel 5, it must of necessity revolve in the same direction as said sprocket-wheel, (see Figs. 2 and 4,) and in doing so the balls 14 will be caught between the flat surface of the triangular notches 13 and the inside of the ball-race 15, thereby securely locking the wheel 12 and the traverse 6, and as the latter is secured to the driven shaft 4 it must also rotate in the same direction. The speed obtained in this manner is the usual quick speed of the bicycle. If, on the other hand, a greater resistance has to be overcome—as, for instance, by taking steeper grades or by sewing-machines when sewing thicker layers of material, and a slower speed must be adopted to increase the power accordingly—the crank 24 must be turned in a direction as indicated by the arrow 26 in Fig. 5. It is clear that the sprocket-wheel 5 and the wheel 12 will now turn in an opposite direction to the one described above, and the balls 14 will drop into the deepest part of the notches 13, as shown in Fig. 3. As in this position of the balls 14 a locking of the wheel 12 with the adjacent traverse 6 is not possible, the motion of the wheel 12 will be transmitted to the wheels 10, imparting motion to the shafts 8 and 9, and these will transmit it in turn to the wheels 11, meshing with the wheel 16, loosely mounted upon the driven shaft 4, as indicated above. The result of the transmission of motion in the above-described manner will be that the balls 22 will lock the hub of the wheel 16 and the rigid ball-race 21 and unite them for the time being as if they were forming but one part, thereby obliging the wheels 11 with the shafts 8 9 to roll around the wheel 16, rotating thereby the traverses 6 and 7 and the driven shaft 4 in exactly the same direction as when the crank 24 was turned in the direction of the arrow 25 in Fig. 4, but with a far slower speed, of course. During this mode of rotating the driven shaft 4 only the balls 22 are in action and lock the wheel 16 to the ball-race 21, while the balls 14 remain idle in the triangular notches 13 of the hub of the wheel 12. By turning the crank 24 again, as indicated in Fig. 4, the balls 22 will return to the deepest part of the triangular notches 17 in the hub of the wheel 16, while the balls 14 come into action again and lock the wheel 12 to the ball-race 15, thereby rotating the driven shaft 4, as explained in the first instance.

It is obvious that many changes in the details of construction could be made to suit best the different modes of application to each individual case without departing from the spirit of my invention.

I claim—

1. A driving mechanism comprising a driving-shaft, a sprocket-wheel seated upon said driving-shaft, a driven shaft, traverses fixed thereto, shafts journaled in said traverses, wheels mounted at both ends of said shafts, a sprocket-wheel loosely mounted upon the driven shaft and provided with triangular notches, a wheel seated upon the hub of this sprocket-wheel, lock-balls in the triangular notches of the hub of said sprocket-wheel, a ball-race on the adjacent traverse inclosing said balls and hub, a threaded hollow stud, a second ball-race thereon, a wheel provided with triangular notches loosely mounted upon the driven shaft and arranged between one of said traverses and said ball-race on the hollow stud, lock-balls in the triangular notches of the hub of said last-named wheel, and a chain to transmit the motion of the driving-shaft to the driven shaft.

2. A driving mechanism comprising a driving-shaft capable of being rotated in opposite directions, a larger sprocket-wheel upon said driving-shaft, a driven shaft, a smaller sprocket-wheel provided with triangular notches and loosely seated upon the driven shaft, a wheel seated upon the hub of said smaller sprocket-wheel, a chain connecting both sprocket-wheels, traverses upon the driven shaft, a ball-race secured to one of said traverses, lock-balls in said triangular notches locking said ball-race to the hub of the smaller sprocket-wheel and causing the driven shaft to rotate quick when the driving-shaft is rotated to the right, a hollow threaded stud having a ball-race, a wheel provided with triangular notches and loosely mounted upon the driven shaft, lock-balls in the triangular notches of the hub of said wheel, shafts journaled in the traverses, wheels upon both ends of said shafts meshing on the one hand with said loosely-mounted wheel upon the driven shaft and on the other hand with the wheel upon the hub of the smaller sprocket-wheel and forming the means of locking the ball-race on the hollow stud to said loosely-mounted wheel causing the slower rotation of the driven shaft when the driving-shaft is rotated to the left.

In testimony that I claim the foregoing as my invention I have signed my name in presence of two subscribing witnesses.

CHRISTIAN STOLLEWERK.

Witnesses:
FRIEDRICH ALEX,
C. E. BRUNDAGE.